2 Sheets—Sheet 1.

J. M. CAYCE.
Hydrometer and Liquid-Meter.

No. 211,554. Patented Jan. 21, 1879.

WITNESSES:
W. W. Hollingsworth
Amos W. Hart

INVENTOR:
Jno. M. Cayce
BY
ATTORNEYS.

2 Sheets—Sheet 2.
J. M. CAYCE.
Hydrometer and Liquid-Meter.
No. 211,554. Patented Jan. 21, 1879.
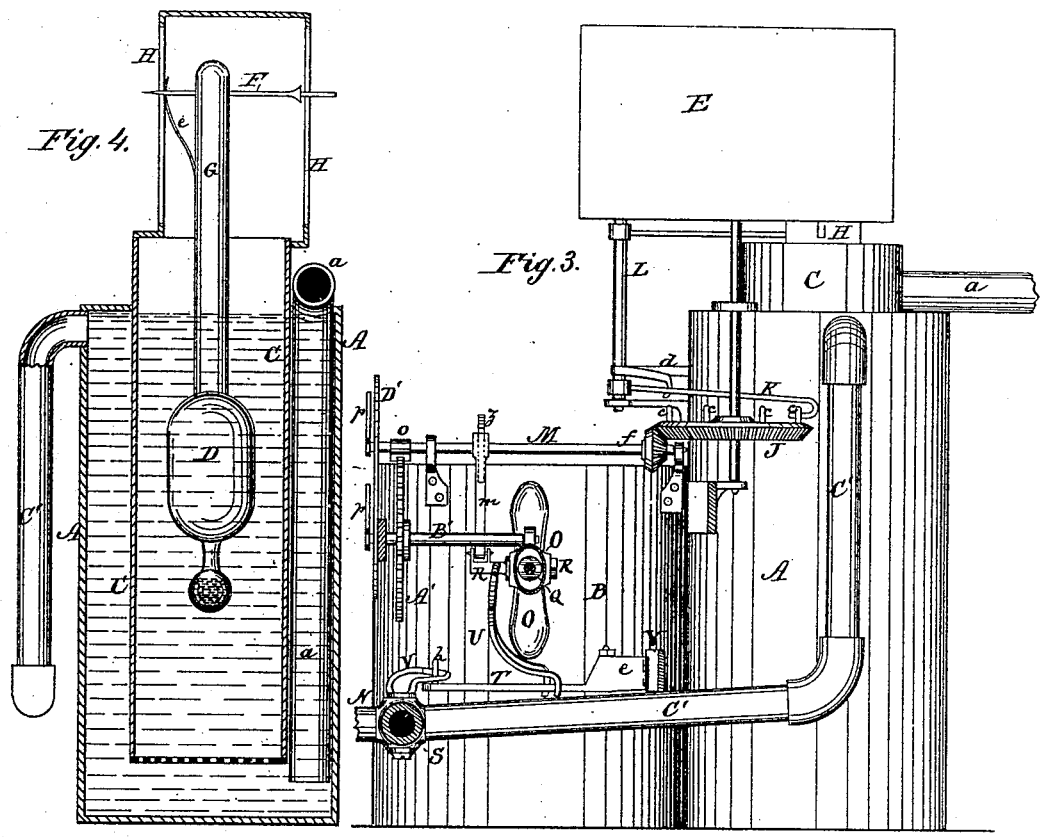
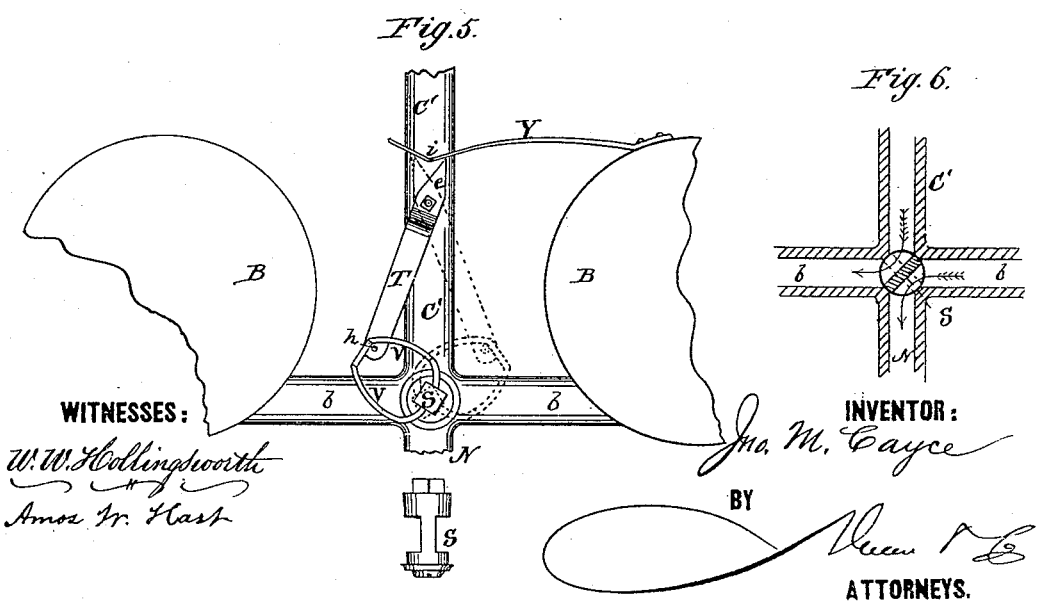
WITNESSES:
W. W. Hollingsworth
Amos W. Hast
INVENTOR:
Jno. M. Cayce
BY
ATTORNEYS.

UNITED STATES PATENT OFFICE.

JOHN M. CAYCE, OF FRANKLIN, TENNESSEE.

IMPROVEMENT IN HYDROMETER AND LIQUID-METER.

Specification forming part of Letters Patent No. 211,554, dated January 21, 1879; application filed May 29, 1878.

*To all whom it may concern:*

Be it known that I, JOHN M. CAYCE, of Franklin, in the county of Williamson and State of Tennessee, have invented a new and Improved Combined Automatic Hydrometer and Liquid-Meter; and I do hereby declare that the following is a full, clear, and exact description of the same.

The object of my invention is to provide an improved apparatus, chiefly for use of distillers and the Government, for measuring and determining the specific gravity of spirits or alcoholic liquors.

The invention is an improvement in the class of such apparatus in which the specific gravity is indicated and registered by a marker carried by a float, and operated by devices connected with the meter or measuring-cylinders.

The hydrometer is of the weighted class—that is to say, its function of registration depends upon the rise and fall of a float which is supported by the liquid, and immersed in it to a greater or less depth, according to the specific gravity of the liquid. To the stem of the float is attached a device which simultaneously records upon a rotating drum the variations in the density of the liquid, and also its volume in gallons, as it passes through the hydrometric vessel.

The action of the liquid-meter, and also the hydrometric recording apparatus, depends upon the alternate rise and fall of two connected floats contained in two contiguous cylinders, through which the liquid passes as it comes from the hydrometer. The floats are connected by a centrally-pivoted lever, and its oscillation effects two results, namely: It operates a four-way cock, which alternately discharges the liquid from the two cylinders, and simultaneously operates the apparatus which records upon a dial the number of gallons thus discharged. Second, it operates the recording apparatus which is connected with the hydrometer.

The pressure of the liquid in the measuring cylinders or vessels is therefore the active force which, through the agency of the floats or float-lever, puts both the hydrometer and liquid-meter in operation.

To enable my invention to be fully understood, I will proceed to describe in detail the apparatus in which it is embodied, the same being shown in accompanying drawings, in which—

Figure 1:
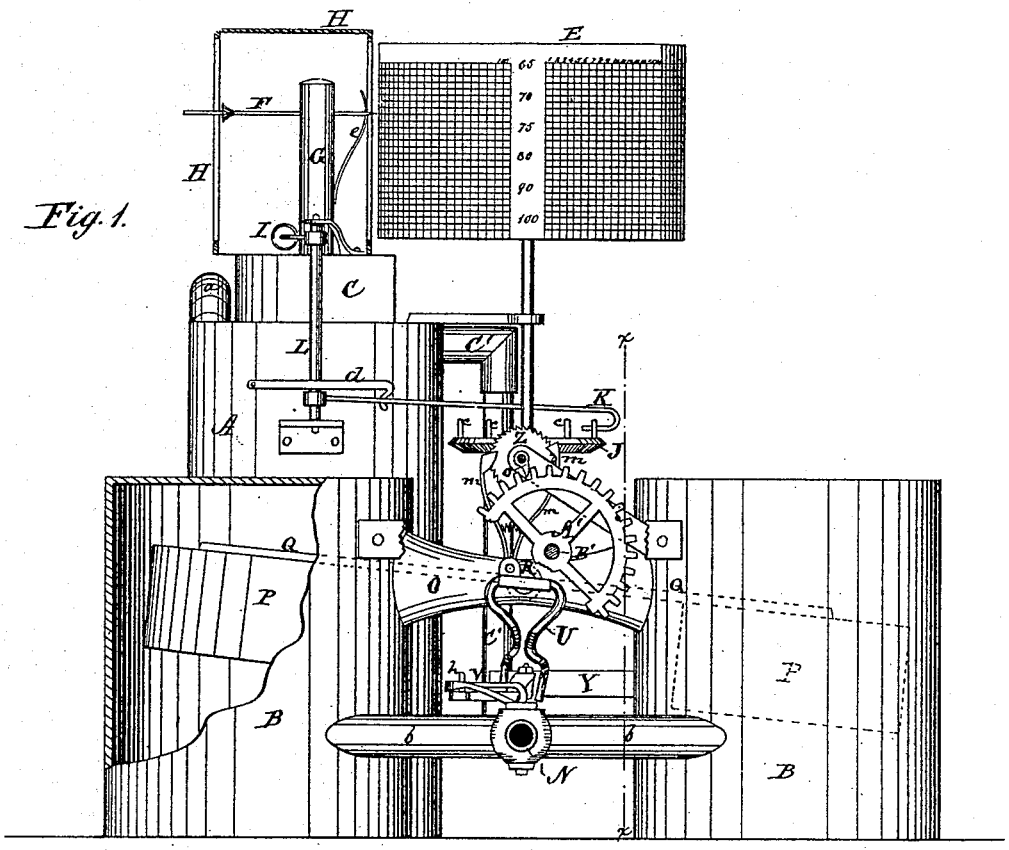
Figures 2, 7:
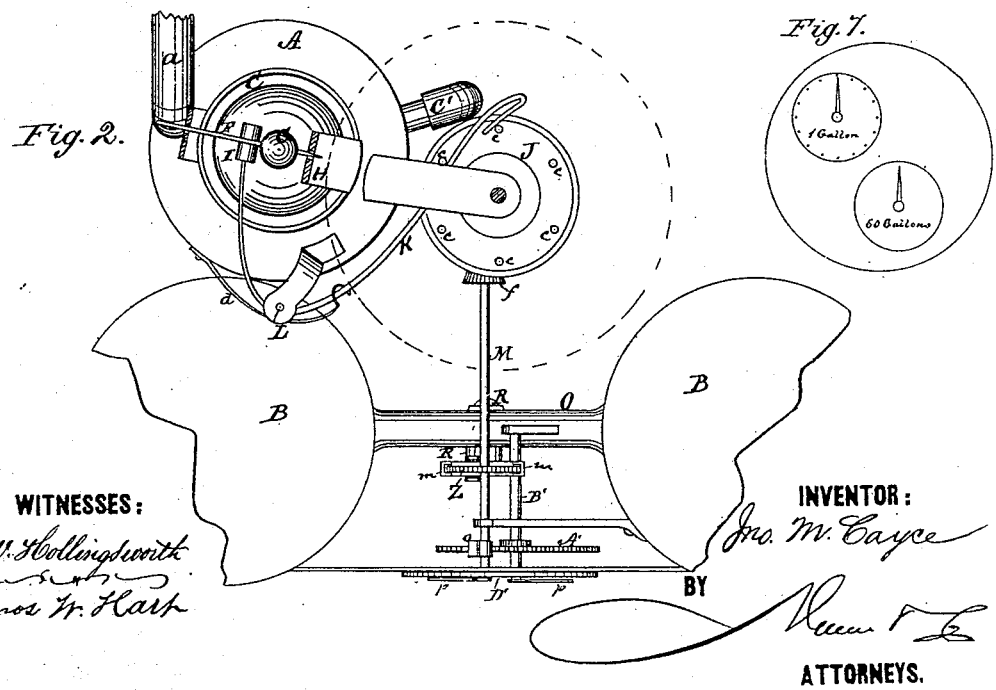

Figure 1 is mainly a front elevation, a small portion being in section. Fig. 2 is a top-plan view. Fig. 3 is a vertical sectional elevation, the section being on line $x$ $x$ of Fig. 1. Fig. 4 is a vertical section of the hydrometer proper. Fig. 5 is a detail plan view. Fig. 6 is a detail horizontal section through the four-way cock and bifurcated liquid-conducting pipe. Fig. 7 represents a face view of the dial.

A indicates the hydrometric cylinder or vessel, and B B the two oppositely-placed cylinders, forming the main parts of the liquid-meter.

The hydrometric cylinder A has an inner tube or cylinder, C, having a perforated bottom, but open at the top. This inner tube constitutes a well, in which the float D is placed.

The liquid is received into the vessel A, at the top, through a pipe, $a$, which is extended down nearly to its bottom, and an exit-pipe, C', is attached on the opposite side of the cylinder, near the top, and extends to and communicates with the meter-cylinders B B. The level of the liquid in the well C and in the annular chamber of the vessel A will be kept the same, under varying pressure, by means of a governor. (Not shown.)

The float D will rise and fall correspondingly to the variation in gravity of the liquid. This movement is recorded on a paper sheet wrapped around the rotating drum E by means of a needle or stylus, F, which is fixed transversely in the head of the stem G of the float, and works in vertical slots in a guide-frame, H, attached to the vessel A. This hydrometric record made by the stylus F is, however, not a continuous mark or line, but a series of punctures, indentations, or dots made at regular intervals of distance.

If the punctures or marks made by the stylus are in the same horizontal plane, it is thereby indicated that the specific gravity of the liquid passing through the cylinder A has not varied during the time the drum was making its rotation. If, on the other hand, said punctures or marks are not in the same horizontal plane, it is a sure indication that the gravity of the liquid has varied in such time; and the irregularity of the line of punctures or marks—i. e., the variation of the marks from a certain horizontal line—will, of course, exactly correspond to the extent of such variation in gravity.

For convenience in reading and ascertaining the hydrometric record thus made on the drum, I divide the sheet attached to the drum into horizontal spaces by parallel horizontal lines, and apply a graduated scale to the sheet, by which it may be easily seen what the special hydrometric record is for different liquids, or for the same liquid at different times during its flow through the vessel A. This scale may be varied for the different liquids, and in any case the paper sheet is detached from the drum and another applied thereto whenever the drum has made a complete rotation, so that the line of punctures or other marks extends around it.

To facilitate application and removal of the sheet, the drum is preferably made detachable from its shaft. Said shaft is placed vertical, in suitable bearings, and is rotated as hereinafter described.

The aforesaid intermittent action of the stylus F is caused by the blows of a hammer, I, whose action, in turn, depends upon the rotation of the tappet-wheel J, which is fixed on the drum-shaft, and has spurs $c$ on its upper side, which come intermittently in contact with the spring-arm K, attached to the same vertical rock-shaft L as the hammer I. The spring $d$, which bears on the arm K, holds the hammer away from the float-stem G, except when the spurs $c$ of the tappet-wheel act on said arm; and a spring, $e$, also holds the point of the stylus F away from the drum E except when its tension is overcome by the sudden blow of the hammer. The tappet-wheel J has beveled teeth, and meshes with a pinion, $f$, on a horizontal shaft, M, which is located between the meter-cylinders B B, and to which rotary motion is imparted by the rise and fall of the floats in said cylinders, as will be presently explained. The spurs $c$ are set in the tappet-wheel at such points or intervals of distance that one of them will act on arm K, and thus cause the hammer I to give a blow each time a gallon of liquid passes through the meter and is discharged by the cock or spigot N. In this manner the hammer I gives a blow, and the stylus F makes a puncture in the paper sheet wrapped around the drum E each time a gallon of liquid is discharged. A perfect record is thereby made on the drum of the number of gallons of liquid that pass through the cylinders A and B, and this is done simultaneously with the record of the density of such liquid, and by the same means. The punctures or marks of the stylus on the drum are thus at once a hydrometric and liquid-measure record.

For convenience in reading the record of the liquid-measurer—in other words, for convenience in counting the number of punctures or marks, and thereby ascertaining the number of gallons which they indicate have been discharged from the meter—I divide the paper sheet into vertical spaces by parallel vertical lines, and number such spaces from 1 upward. Hence, if but one puncture or mark be made by the stylus F, it will be in the space numbered 1, and if one hundred marks are made, the last mark will be in the space numbered 100, so that the number of gallons discharged can be known at once upon inspection of the drum.

I will now describe the parts which, together with the recording apparatus above described, constitute the liquid-meter. The cylinders B B are connected by a tube, O, and the circular floats P in said cylinders are attached to the respective ends of an oscillating lever, Q, which extends through the tube O, and is fulcrumed in the middle thereof by means of a cylindrical pivot or shaft, R. The tube O is narrow in transverse section, but its ends are made sufficiently wide in a vertical direction to allow the lever Q to move through arcs of the required length. The shaft R closes communication between the cylinders B B, so that no liquid can pass from one to the other through the tube O.

The pipe C′, through which the liquid flows from the hydrometric cylinder A, is divided into branches $b\ b$, which connect with the lower portions of the meter-cylinders B B. At the point of bifurcation is located a four-way cock, S, which may be placed in either of two positions to allow simultaneous admission of liquid to one cylinder B while the other is discharging its contents through cock N, as will be readily understood upon reference to Fig. 5.

The vibration of the float-lever Q, caused by the alternate rise and fall of the respective floats P, adjusts the position of the four-way cock S, and such adjustment is effected through the medium of the following-named devices: first, horizontal lever T, pivoted to a support between the tube O and pipe C′; second, tappet-arms U, pendent from the pivot-shaft R of the float-lever; and, third, arms V, attached to the head of the four-way cock S. When a float, P, rises in its cylinder B it turns the shaft R and throws the arms U to the right or left, as the case may be. One of said arms is thus caused to strike against the lever T and throw it into corresponding position—i. e., to the right or left. The prong $h$ on the front end of the lever T then comes in contact with one of the arms V on cock S, and it is also shifted. To hold the cock S fixed in either adjustment until the floats P again change position, and thereby again shift the lever T, I employ a plate-spring, Y, having an angular projection, $i$, which acts as a stop or shoulder for the rear end or shorter arm, $e$, of said lever. But slight force is, however, required to overcome the stress of the spring Y and enable the lever T to be shifted.

I have now described the connection between the floats and the four-way cock S, by which the liquid is allowed to enter one cylinder B while the other cylinder discharges its contents.

I will proceed to describe the connection between the floats and the recording apparatus. This is effected, in part, by push and pull pawls m m and a ratchet-wheel, Z, fixed on the aforementioned shaft M. Said pawls m m are pivoted eccentrically to the projecting end of the rock-shaft R of the float-lever Q, so that as the shaft R oscillates it will cause the pawls to rotate the shaft M intermittently, and thereby communicate like motion to the bevel tappet-wheel J, and through it operate the recording mechanism, as previously described.

A tappet arm or wiper, o, is fixed on the shaft M in front of the ratchet-wheel Z, which moves a large toothed gear, A', the distance of one tooth at each rotation of the shaft M.

Both the shaft M and the shaft B' of gear A' project through a dial-plate, D', affixed to a suitable support between the cylinders B B. An index-finger, p, is affixed to each shaft and the dial-plate is inscribed with two graduated circles, one for each index-finger. One circle has numbers from 1 upward—that is to say, the maximum is the same as the number of the teeth on the ratchet-wheel, say, 100. The other circle has numbers from 10 upward to 1,000, or more. By this arrangement one index-finger indicates the number of gallons less than one hundred, and the other index-finger the number exceeding one hundred, which have passed through the meter-cylinders B B. The reading or record of the dial will therefore always correspond with the record of the number of gallons made by the stylus F on the drum E when the hydrometer is used together with the liquid-meter; but in case the meter is used for water or other liquid whose specific gravity does not require to be recorded, the hydrometer is left off, and the dial-index will then be used alone.

To recapitulate the operation of the apparatus: The liquid enters the hydrometric cylinder A through pipe, rises in well C, raises float D, and discharges into pipe C', through which it passes to one of the liquid-meter cylinders B B. Suppose the four-way cock S to be set as shown in Fig. 6, the liquid would enter the left-hand cylinder B; and when a sufficient quantity, say, one gallon, has entered, the float therein is raised and the shaft R turned to shift lever T, and thereby shift the cock S to the other position, shown in dotted lines, Fig. 6. This would cut off the entrance of the liquid to such left-hand cylinder B and allow its contents to discharge while the other cylinder would be simultaneously filling. The rocking of shaft R would also cause the pawls m to rotate the ratchet Z and shaft M a part of a revolution, and thus move the tappet-wheel J a corresponding distance. The movement of the tappet-wheel would rotate the drum, operate the hammer I, and effect the desired record on the drum—that is, a record both of the specific gravity of the liquid and the number of gallons passed through the cylinders B. The rotation of shaft M would likewise cause the number of gallons discharged from the meter to be registered on the dial D'.

What I claim is—

1. The combination, with the float and stylus and rotating drum, of the hammer and the tappet-wheel, as shown and described.

2. The combination of the spring c with the stylus F, float-stem G, the frame H, and drum E, as shown and described.

3. The combination of the shaft M, the ratchet-and-pawl mechanism, the vibrating lever connecting the meter-floats, and the tappet-wheel, hammer, recording-stylus, and drum, as shown and described.

4. The combination of the meter supply-tube, the cylinders B B, the four-way cock, the shifting-lever T, the floats and float-lever and its rock-shaft, and means for connecting said levers, so that the vibration of the float-lever will shift the four-way cock, as and for the purpose specified.

5. The combination of the floats and float-lever, the cylinders B, the connecting-tube O, made wide at its ends in a vertical direction, the shaft R, having its bearings in said tube and closing the passage through it, the arms U, lever T, four-way cock S, tube C', ratchet-and-pawl mechanism, shaft M, tappet-wheel, drum, and vibrating stylus, as shown and described.

6. The combination of the angular spring Y with the pivoted lever T e and four-way cock S, as shown and described.

The above specification of my invention signed by me this 20th day of May, A. D. 1878.

JOHN M. CAYCE.

Witnesses:
    W. M. TURNER,
    E. B. CAYCE.